US009446303B2

(12) United States Patent
Shikata et al.

(10) Patent No.: US 9,446,303 B2
(45) Date of Patent: Sep. 20, 2016

(54) NON-TRANSITORY COMPUTER-READABLE STORAGE MEDIUM HAVING INFORMATION PROCESSING PROGRAM STORED THEREON, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Hiromasa Shikata, Kyoto (JP); Masahiro Nakamura, Kyoto (JP); Shiro Mouri, Kyoto (JP); Shinji Okane, Kyoto (JP); Kentaro Tominaga, Kyoto (JP); Yoshihiko Sakuraba, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 14/025,291

(22) Filed: Sep. 12, 2013

(65) Prior Publication Data
US 2014/0357358 A1 Dec. 4, 2014

(30) Foreign Application Priority Data

May 31, 2013 (JP) ................................. 2013-116227

(51) Int. Cl.
G06T 15/00 (2011.01)
A63F 13/00 (2014.01)

(52) U.S. Cl.
CPC ..................................... A63F 13/00 (2013.01)

(58) Field of Classification Search
None
See application file for complete search history.

(56) References Cited

U.S. PATENT DOCUMENTS 6,155,926 A * 12/2000 Miyamoto et al. ............. 463/32
6,340,330 B1 * 1/2002 Oishi ...................... A63F 13/10
463/1
8,000,328 B1 * 8/2011 Kandekar et al. ............ 370/392
2003/0166413 A1 9/2003 Hayashida et al.
2007/0202949 A1 * 8/2007 Kawade .................. A63F 13/10
463/32
2007/0206003 A1 * 9/2007 Yoshida .................. A63F 13/10
345/419
2011/0018868 A1 * 1/2011 Inoue ...................... A63F 13/10
345/419
2011/0306417 A1 * 12/2011 Sheblak .................. A63F 13/10
463/32
2012/0309519 A1 * 12/2012 Hansen et al. ................. 463/31
2013/0225289 A1 * 8/2013 Yoshimitsu ..................... 463/31
2014/0038708 A1 * 2/2014 Davison et al. ................. 463/31

FOREIGN PATENT DOCUMENTS

JP 2003-290550 10/2003

OTHER PUBLICATIONS

Konami, "Metal Gear Solid" instruction manual, Sep. 1999, Konami of America, pp. 2-4 and 19-20.*
Nintendo, "Super Paper Mario" instruction manual, Apr. 2007.*

* cited by examiner

Primary Examiner — Andrew G Yang
(74) Attorney, Agent, or Firm — Nixon & Vanderhye PC

(57) ABSTRACT

Diversification of a game field is realized while maintaining appropriate visibilities of the game field and a player object. An information processing apparatus includes: an object control section which controls movement of the virtual object by performing, based on a predetermined condition, switching between a first and a second state in which a virtual object movable region in the virtual space is restricted to a first and a second region, respectively; an image generation section which generates an image taken by a virtual camera; and a virtual camera control section which sets, in the first state, the position of the virtual camera to a first viewpoint that is a high-angle viewpoint with respect to the first region, and sets, in the second state, the position of the virtual camera to a second viewpoint that is a viewpoint other than the high-angle viewpoint.

31 Claims, 12 Drawing Sheets

NON-TRANSITORY COMPUTER-READABLE STORAGE MEDIUM HAVING INFORMATION PROCESSING PROGRAM STORED THEREON, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2013-116227, filed on May 31, 2013, is incorporated herein by reference.

FIELD

The exemplary embodiment relates to information processing of an information processing apparatus. More particularly, the exemplary embodiment relates to a non-transitory computer-readable storage medium having an information processing program stored thereon, an information processing apparatus, an information processing system, and an information processing method, which are configured to control movement and display of a virtual object located in a virtual space.

BACKGROUND AND SUMMARY

Conventionally, a video game has been known, in which a virtual object moving in a virtual space is displayed from a viewpoint that follows the virtual object.

In such a video game, a game field in the virtual space is, for example, a dungeon formed of a ground, and objects such as walls that partition the ground. A player object moves on the ground in the dungeon with its movement being restricted by the objects such as walls. A player is provided with, as a game image, an image in which the game field and the player object are viewed from a viewpoint that follows the player object, for example. If the player object is hidden behind another object, a mark indicating the position of the player object is additionally displayed in the game image.

As video games are more sophisticated and complicated, diversification of game fields is also demanded. Further, when a game field is diversified, it is important to maintain and improve visibilities of the game field, a player object, and the like in a game image.

Therefore, an object of the exemplary embodiment is to realize diversification of a game field while maintaining appropriate visibilities of the game field and a player object.

In order to achieve the above object, for example, the following configuration examples are exemplified.

A configuration example is a non-transitory computer-readable storage medium having stored thereon an information processing program which causes a computer of an information processing apparatus which controls display of a virtual object located in a virtual space to operate as: an object control section configured to control movement of the virtual object in a first state and a second state by performing, based on a predetermined condition, switching between the first state in which a region where the virtual object is movable in the virtual space is restricted to a first region, and the second state in which a region where the virtual object is movable in the virtual space is restricted to a second region different from the first region; an image generation section configured to generate an image taken by a virtual camera located in the virtual space; and a virtual camera control section configured to set, in the first state, the position of the virtual camera to a first viewpoint that is a high-angle viewpoint with respect to the first region, and set, in the second state, the position of the virtual camera to a second viewpoint that is a viewpoint other than the high-angle viewpoint. The predetermined condition includes a condition different from a condition that the virtual object moves in the region where the virtual object is movable, in at least one of switching from the first state to the second state and switching from the second state to the first state.

The object control section may switch the virtual object to different virtual objects in the first state and the second state, respectively.

The different virtual objects may be different from each other in at least one of shape, color, and pattern.

The different virtual objects may be a virtual object having a three-dimensional shape in the first state, and a virtual object having a planar shape in the second state.

When the object control section performs switching between the first state and the second state, the virtual camera control section may gradually change the position of the virtual camera between the first viewpoint and the second viewpoint.

When the object control section performs switching between the first state and the second state, the virtual camera control section may gradually change the direction of the virtual camera between the direction thereof at the first viewpoint and the direction thereof at the second viewpoint.

The image generation section may generate, as the image taken from the first viewpoint by the virtual camera, an image obtained by taking a wider region in the virtual space, as compared to an image taken from the second viewpoint by the virtual camera.

The virtual camera control section may set the first viewpoint and the second viewpoint so that the distance between the second viewpoint and the virtual object is shorter than the distance between the first viewpoint and the virtual object.

The object control section may control movement of the virtual object, based on a movement instruction input performed by a user, which instructs movement of the virtual object in the first region and the second region. At least one of the switching from the first state to the second state and the switching from the second state to the first state may be performed based on a switching instruction input performed by a user, which instructs the switching.

The switching instruction input may be an input different from the movement instruction input.

The first region and the second region may be perpendicular to each other in the virtual space.

The virtual camera control section may set the direction of the virtual camera at the second viewpoint so that an amount of change in a left/right direction of the virtual camera with respect to the virtual space is equal to or smaller than a predetermined angle, in a case where the position of the virtual camera is switched from the first viewpoint to the second viewpoint.

The virtual camera control section may set, in the second state, the second viewpoint based on a moving path along which the virtual object is scheduled to move.

The moving path may be specified based on the shape of the second region.

The moving path may be specified based on the shape of a region within a predetermined distance along the second region from the virtual object, the region being included in the second region.

The virtual camera control section may set the second viewpoint, based on at least the direction of a surface of a region along which the moving path extends, the region being included in the second region.

The virtual camera control section may set the second viewpoint, based on at least the length of the moving path along a region along which the moving path extends, the region being included in the second region.

The information processing program can be stored in any non-transitory computer-readable storage medium (e.g., a flexible disc, a hard disk, an optical disc, a magneto-optical disc, a CD-ROM, a CD-R, a magnetic tape, a semiconductor memory card, a ROM, a RAM, etc.).

According to the configuration example, it is possible to realize diversification of a game field while maintaining appropriate visibilities of the game field and a player object.

BRIEF DESCRIPTION OF THE DRAWINGS

FIG. 6 is a flowchart showing an example of a process performed by a processor and the like;

DETAILED DESCRIPTION OF NON-LIMITING EXEMPLARY EMBODIMENTS

Hereinafter, an exemplary embodiment will be described.

Figure 1:
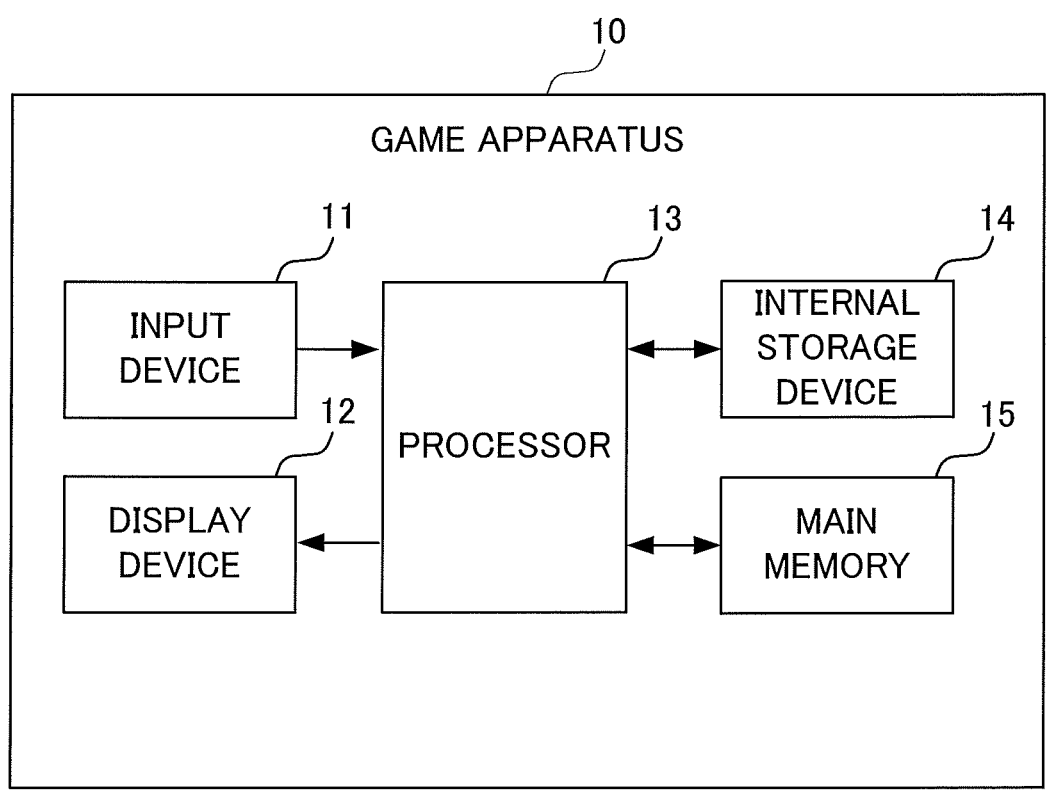
FIG. 1 is a block diagram showing an example of a configuration of a game apparatus.

FIG. 1 shows an internal configuration of a game apparatus 10 according to the present embodiment. The game apparatus 10 is, for example, a hand-held game apparatus, and includes an input device 11, a display device 12, a processor 13, an internal storage device 14, and a main memory 15. The game apparatus 10 may be either of a hand-held type or a stationary type.

The input device 11 is operated by a user of the game apparatus 10, and outputs a signal according to the operation performed by the user. The input device 11 is, for example, a cross switch, a push button, or a touch panel. The display device 12 displays, on a screen, an image generated by the game apparatus 10. The display device 12 is typically a liquid crystal display device. In the internal storage device 14, a computer program to be executed by the processor 13 and various data described later are stored. The internal storage device 14 is typically a flash EEPROM. The main memory 15 temporarily stores the computer program and the various data. The game apparatus 10 may be connectable to a detachable external storage device that stores a computer program and various data, in addition to or instead of the internal storage device 14. Further, the game apparatus 10 may include a communication device that transmits/receives signals to/from other game apparatuses by means of wireless communication or wired communication.

(Outline of Game)

Hereinafter, an outline of a game performed by the game apparatus 10 according to the present embodiment will be described.

Figure 2:
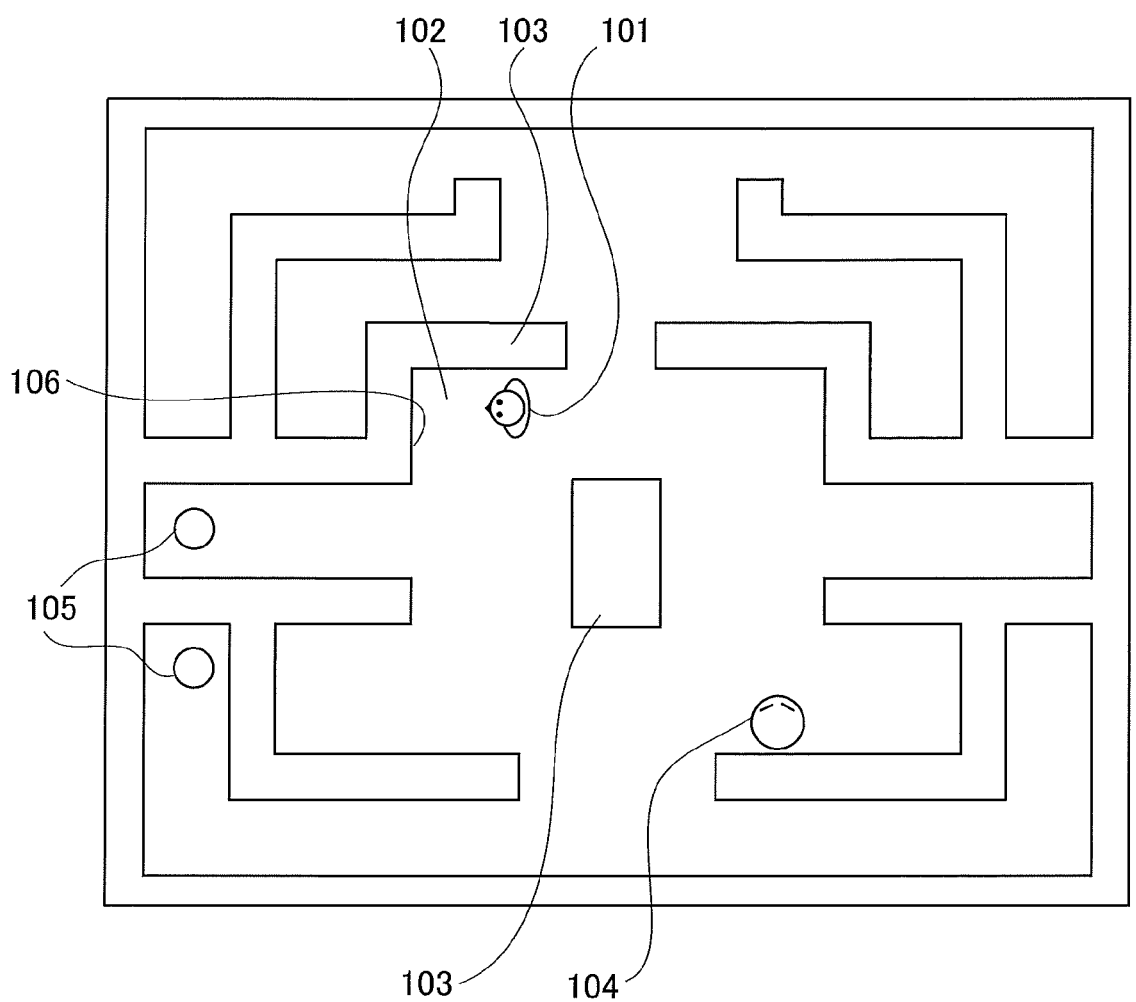
FIG. 2 is a diagram showing an example of a game screen viewed from a first viewpoint.

In this game, a player object as a virtual object moves in a game field in a virtual space, based on a user instruction or the like. FIG. 2 is a diagram showing an example of a game field viewed from above. In the game field, virtual objects, such as a player object 101, a ground 102, walls 103, an enemy character 104, and various items 105, exist. Each wall 103 has a wall surface 106 substantially perpendicular to the ground 102.

In this game, a first state and a second state are provided, each being a movement restriction state in which a region where the player object 101 is movable in the game field is restricted to a specific movement restriction region. In the first state, the movement restriction region is set to the ground 102 as a first region. In this state, the display device 12 displays, on the screen, an image viewed from a high-angle viewpoint (hereinafter referred to as a first viewpoint) that looks down on the game field in a direction substantially perpendicular to the ground 102, as shown in FIG. 2. This image may be an image of the entirety of the game field, or an image of a part of the game field including the player object 101, for example.

Figure 3:
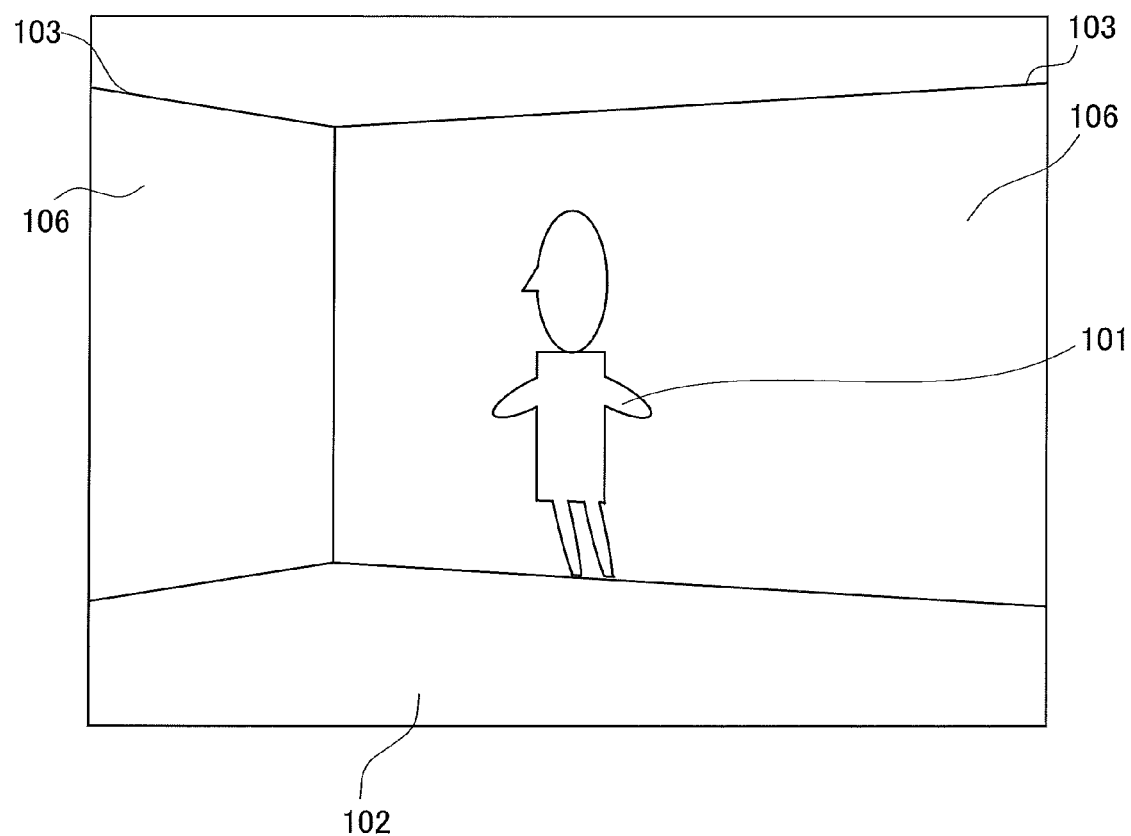
FIG. 3 is a diagram showing an example of a game screen viewed from a second viewpoint.

On the other hand, in the second state, the movement restriction region is set to the wall surface 106 as a second region. FIG. 3 shows a view in which the player object 101 moving along the wall surface 106 in the second state is viewed in a direction substantially parallel to the ground 102. While the player object 101 is three-dimensional in shape in the first state, the player object 101 is planar in shape in the second state, and moves as if it sticks to the wall surface 106 of the wall 103. It is noted that the player object 101 cannot pass through the wall 103 in its thickness direction. Since the shape of the player object 101 is changed between the first state and the second state, the shape of the player object 101 can be made suitable for each movement restriction region, and the player is allowed to easily know the current state of the player object 101. Further, in this second state, the display device 12 displays, on the screen, an image viewed from a viewpoint other than the high-angle viewpoint (hereinafter referred to as a second viewpoint), from which the player object 101 and the wall surface 106 are viewed at substantially the same height as the player object 101 as shown in FIG. 3, so that the player object 101 and the wall surface 106 are easily visible.

Switching of the movement restriction state is performed when a predetermined condition is satisfied, based on a user operation received by the input device 11, or game progress. Although the condition is not particularly limited, the condition of switching from the first state to the second state may be set so as to include a condition different from that the player object 101 moves on the ground 102 as the first region. For example, the condition may be that a user operates a specific press button, while the user operates a direction switch to make an instruction to move the player object 101 in a direction toward any wall surface 106 and then the distance between the player object 101 and the wall surface 106 is equal to or smaller than a predetermined distance. In this example, movement of the player object 101 remains to be restricted to the first region if the operation of bringing the player object 101 close to the wall surface 106 is merely continued. However, thereafter, if the user performs a press button operation different from a cross button operation or the like, the first state is switched to the second state, and the movement restriction region is switched to the wall surface 106. In this way, by including, in the condition for switching, the condition different from the movement of the player object 101 in the first region, switching of the movement restriction state, which is not intended by the user, is prevented from being performed in association with the movement of the player object 101 or the operation performed by the user for this movement, thereby improving the operability of the player object 101.

Likewise, a condition for switching from the second region to the first region may include a condition different from that the player object 101 moves on the wall surface 106 as the second region.

Further, in contrast to the above-mentioned examples, the condition for switching of the movement restriction state may be only movement of the player object 101. Alternatively, in addition to the user operation, a variety of conditions for switching of the movement restriction state may be set according to game settings, such as acquisition of the various items 105, a lapse of time from the last switching, and the like. Further, the correspondence of the facing direction and the moving direction of the player object 101 before the switching with those after the switching may be determined in advance.

The game image displayed on display device 12 is generated as an image viewed from a virtual camera in the virtual space. That is, the virtual camera moves in the virtual space and turns its direction to take images of the objects such as the player object 101. The virtual camera moves between the first viewpoint and the second viewpoint every time switching between the first state and the second state is performed. When the virtual camera moves between the first viewpoint and the second viewpoint, the position and direction of the virtual camera are gradually changed. That is, the game image displayed on the display device 12 is gradually changed so that the player can easily know the change of the viewpoint. Either the position or the direction of the virtual camera may be gradually changed. For example, after the gradual change of the position of the virtual camera, at a moment when movement of the viewpoint has ended, the direction of the virtual camera may be instantaneously changed.

At the time of switching from the first viewpoint to the second viewpoint, in order to avoid a situation that the player loses his/her sense of direction due to a large change in the left/right direction of the virtual camera, an amount of change in the left/right direction viewed from the virtual camera is set to be equal to or smaller than a predetermined angle with respect to the virtual space. FIGS. 4A to 4E show examples of changes of the position and direction of the virtual camera at the time of switching from the first viewpoint to the second viewpoint. Parts (a) of FIGS. 4A to 4E each show a perspective view of the virtual space. In each perspective view, virtual cameras C1 and C2 at the first viewpoint and the second viewpoint, respectively, and a virtual camera C' in the middle of moving are shown. Further, a player object 101-1 located on the ground 102 in the first state and a player object 101-2 located on the wall surface 106 in the second state are shown. Further, each virtual camera is shown with arrows representing an upward direction U and a rightward direction R viewed from the virtual camera (in an image taken by the virtual camera). Parts (b) of FIGS. 4A to 4E each show a plan view of the virtual space viewed from above the first viewpoint. In each plan view, the wall surface 106 and the virtual cameras C1 and C2 are shown. Each virtual camera is shown with an arrow representing a rightward direction R. It is noted that the positional relationships between the objects and the virtual cameras in FIGS. 4A to 4E are for convenience of illustration. Actually, the virtual camera C1 may be further from the ground 102 and the player object 101-1 on the ground 102 may be closer to the wall surface 106 than shown in the figures. In addition, the position and direction of the virtual camera C' in the middle of moving are not limited to those shown in the figures.

Figure 4A:
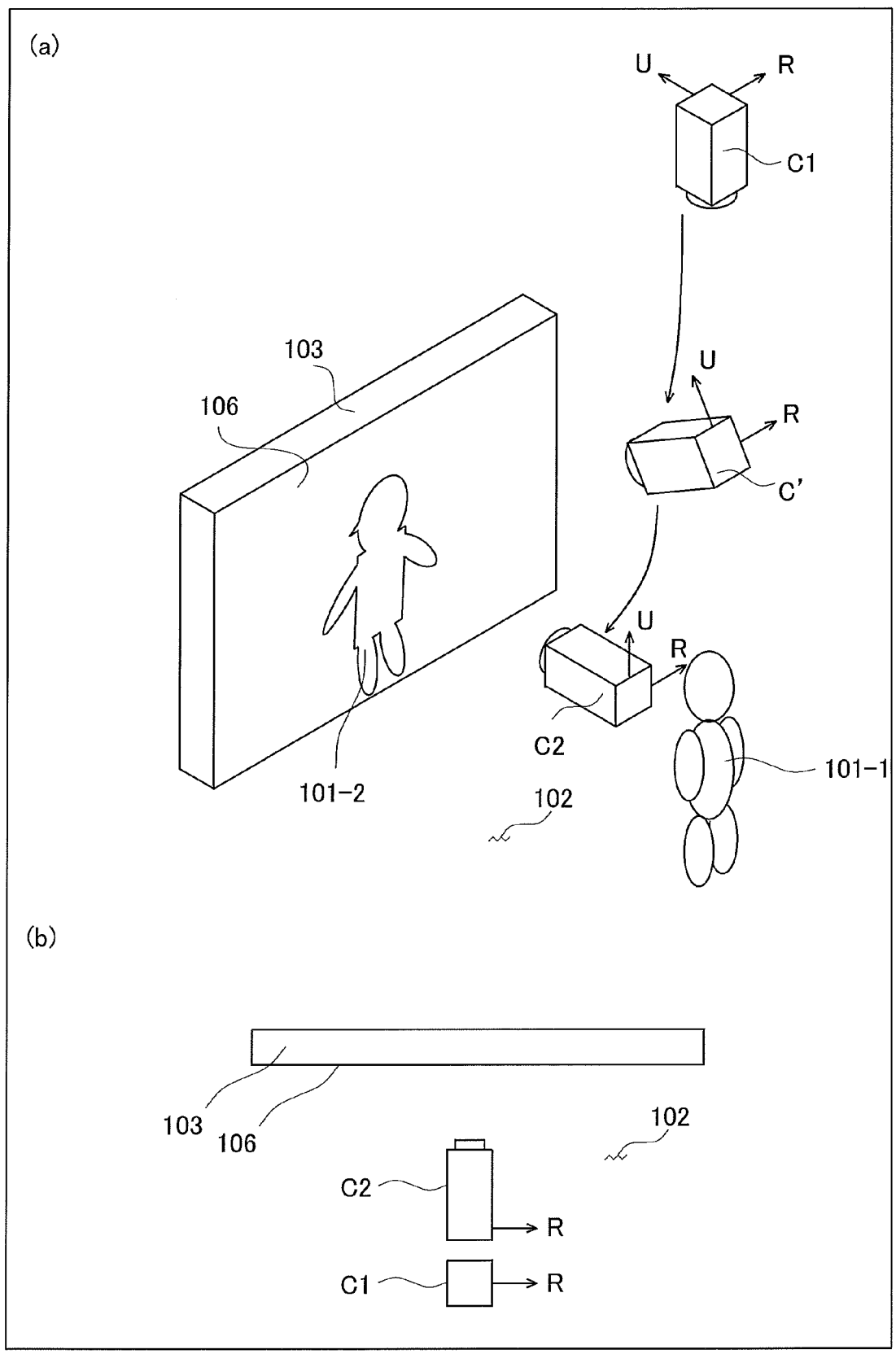
FIG. 4A is a diagram showing an example of movement of a virtual camera from the first viewpoint to the second viewpoint.

First, with reference to FIG. 4A, a case will be described in which the wall surface 106 is located above the player object 101-1, viewed from the virtual camera C1 at the first viewpoint. The virtual camera moves from the first viewpoint to the second viewpoint in such a manner that the height of the virtual camera from the ground 102 is gradually reduced, and a depression angle of the virtual camera is reduced so that the upward direction of the virtual camera approaches the upward direction of the virtual space (a direction that goes away from the ground 102 in the vertical direction).

Figure 4B:
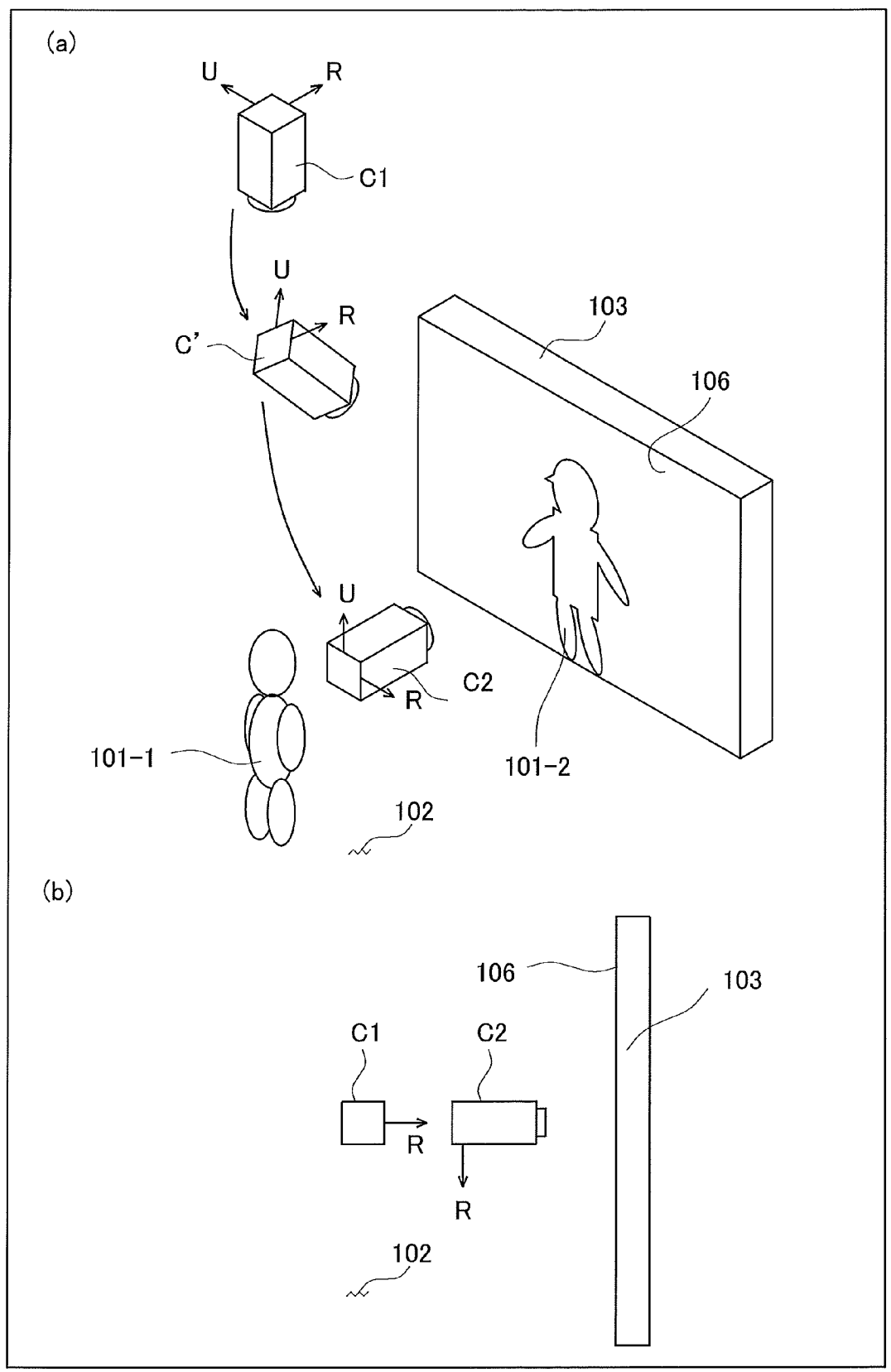
FIG. 4B is a diagram showing an example of movement of the virtual camera from the first viewpoint to the second viewpoint.

Next, with reference to FIG. 4B, a case will be described in which the wall surface 106 is located to the right of the player object 101-1, viewed from the virtual camera C1 at the first viewpoint. The virtual camera moves from the first viewpoint to the second viewpoint in such a manner that the height of the virtual camera from the ground 102 is gradually reduced, the depression angle is reduced so that the upward direction of the virtual camera approaches the upward direction of the virtual space, and the virtual camera is rotated 90° to the right in a left-right direction viewed from the virtual camera.

Figure 4C:
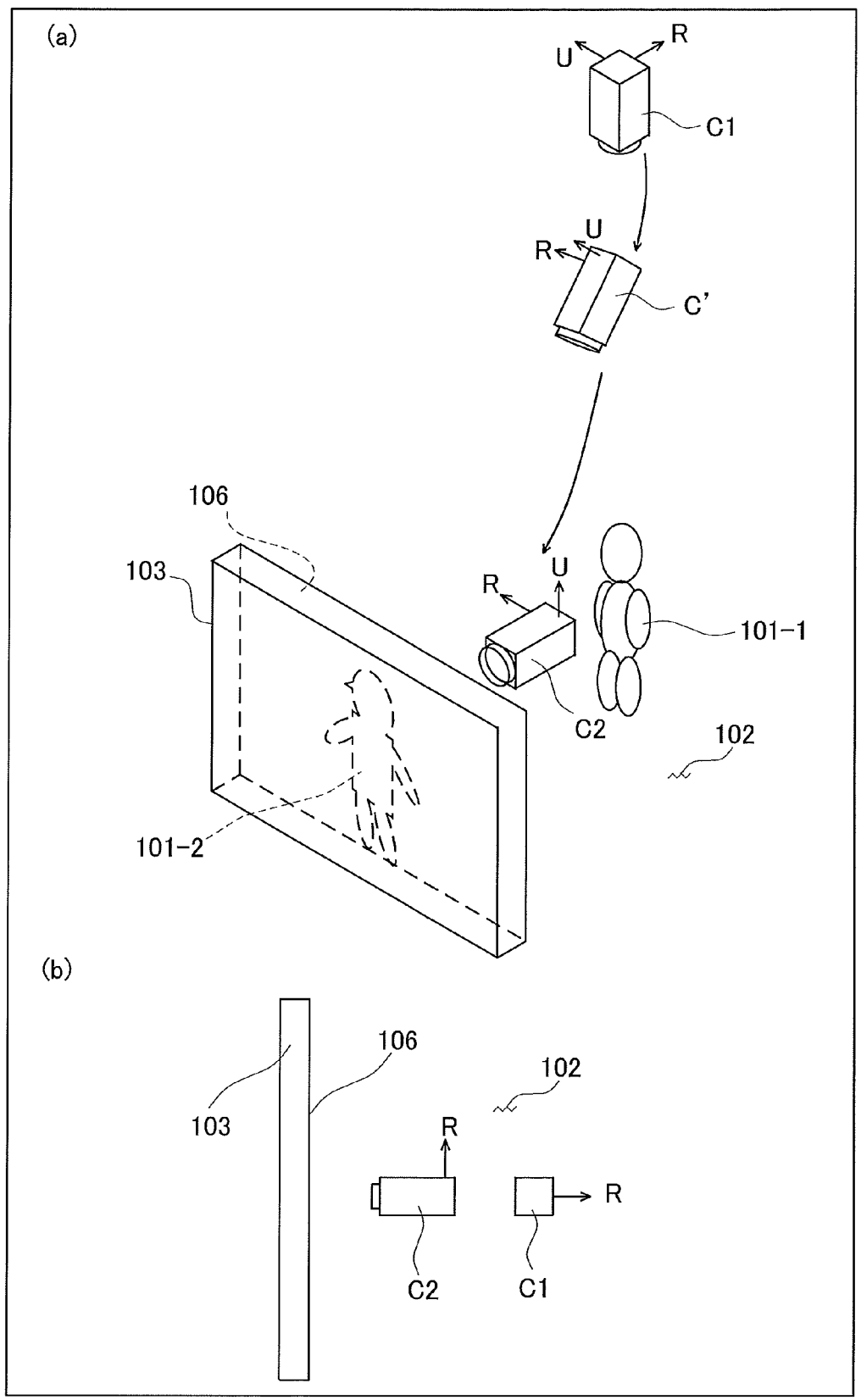
FIG. 4C is a diagram showing an example of movement of the virtual camera from the first viewpoint to the second viewpoint.

Next, with reference to FIG. 4C, a case will be described in which the wall surface 106 is located to the left of the player object 101-1, viewed from the virtual camera C1 at the first viewpoint. The virtual camera moves from the first viewpoint to the second viewpoint in such a manner that the height of the virtual camera from the ground 102 is gradually reduced, the depression angle is reduced so that the upward direction of the virtual camera approaches the upward direction of the virtual space, and the virtual camera is rotated 90° to the left in the left-right direction viewed from the virtual camera.

Figure 4D:
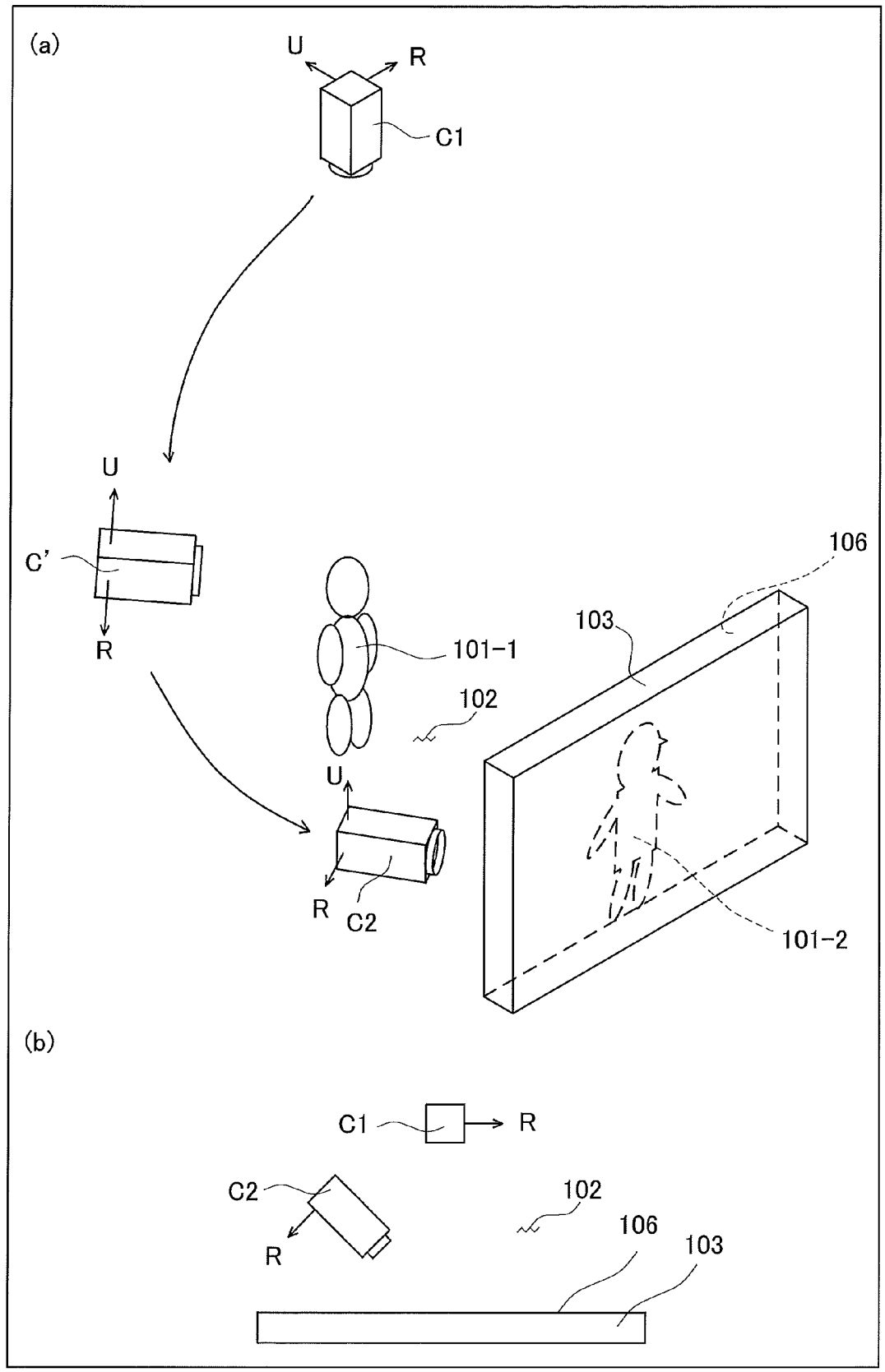
FIG. 4D is a diagram showing an example of movement of the virtual camera from the first viewpoint to the second viewpoint.
Figure 4E:
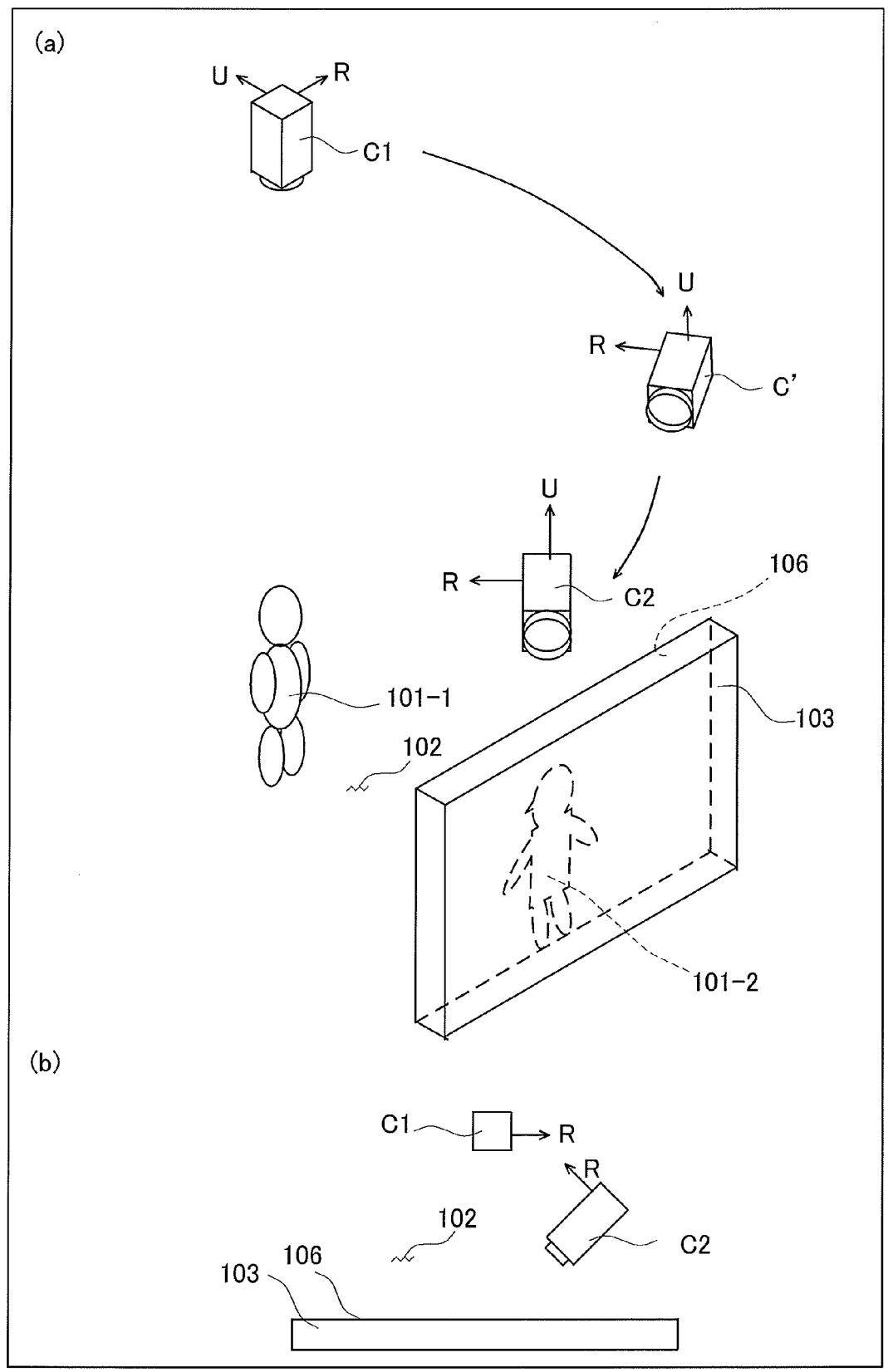
FIG. 4E is a diagram showing an example of movement of the virtual camera from the first viewpoint to the second viewpoint.

Next, with reference to FIG. 4D, a case will be described in which the wall surface 106 is located beneath the player object 101-1, viewed from the virtual camera C1 at the first viewpoint. The virtual camera moves from the first viewpoint to the second viewpoint in such a manner that the height of the virtual camera from the ground 102 is gradually reduced, the depression angle is reduced so that the upward direction of the virtual camera approaches the upward direction of the virtual space, and the virtual camera is rotated 135° to the right in the left-right direction viewed from the virtual camera. Alternatively, in this case, the virtual camera may be rotated 135° to the left in the left-right direction viewed from the virtual camera, as shown in FIG. 4E.

As described above, when the player object 101 moves to the wall surface 106 located beneath the player object 101, the virtual camera is not rotated exceeding an angle of 135° in the left-right direction viewed from the virtual camera, whereby it is possible to reduce the possibility that the player loses his/her sense of direction. It is noted that the direction of the rotation may be determined according to the facing direction of the player object 101-2 on the wall surface 106 shown in FIGS. 4D and 4E. For example, when the player object 101 faces to the right (to the left with respect to the wall surface 106) as shown in FIG. 4D, the virtual camera is rotated 135° to the left. When the player object 101 faces to the left (to the right with respect to the wall surface 106), the virtual camera is rotated 135° to the right.

The first viewpoint and the second viewpoint are not fixed. For example, in the first state, the virtual camera moves so as to constantly look down on the player object 101 from substantially straight above. Further, for example, in the second state, the virtual camera moves so as to follow the player object 101 at substantially the same height as the player object 101. That is, the first viewpoint and the second viewpoint are updated according to the position of the player object 101.

Further, the second viewpoint is updated based on not only the current position of the player object 101 but also an expected moving path of the player object 101. The moving path is expected based on the facing direction of the player object 101 and the shape of the wall 103. Based on the expected moving path, the second viewpoint is gradually updated from the position of the virtual camera C2 shown in FIGS. 4A to 4E immediately after switching from the first viewpoint. At this time, the second viewpoint and the direction of the virtual camera at the second viewpoint are updated so that the player can view the wall surface 106 at which the player object 101 exists and some wall surfaces 106 expected to be the destination of the player object 101. A specific method of calculating the second viewpoint and the direction of the virtual camera at the second viewpoint will be described later.

As described above, by changing the viewpoint of the virtual camera according to switching of the movement restriction state in the game field, it is possible to realize diversification of the game field while maintaining appropriate visibility of the player object 101.

(Details of Game Processing)

Figure 5:
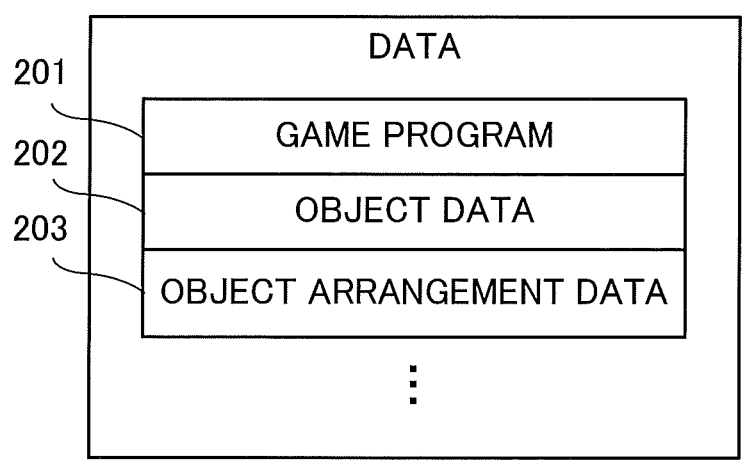
FIG. 5 is a diagram showing examples of a program and data stored in a main memory.

First, a description will be given of major data stored in the main memory 15 of the game apparatus 10 when game processing is performed. FIG. 5 shows examples of the data. In the main memory 15, a game program 201, object data 202, object arrangement data 203, and the like, which have been appropriately loaded from the internal storage device 14, are stored. The object data 202 represents the shapes, patterns, colors and the like of the virtual objects such as the player character 101, the wall 103, the enemy character 104, and the various items 105. The object arrangement data 203 represents arrangement of the virtual objects, and defines the shape of the game field.

Next, the game processing will be described in detail. When the game apparatus 10 is powered on, the processor 13 of the game apparatus 10 executes a boot program stored in the internal storage device 14, thereby initializing the respective units such as the main memory 15. Next, the game program stored in the internal storage device 14 is loaded into the main memory 15, and the processor 13 starts execution of the game program.

Figure 6:
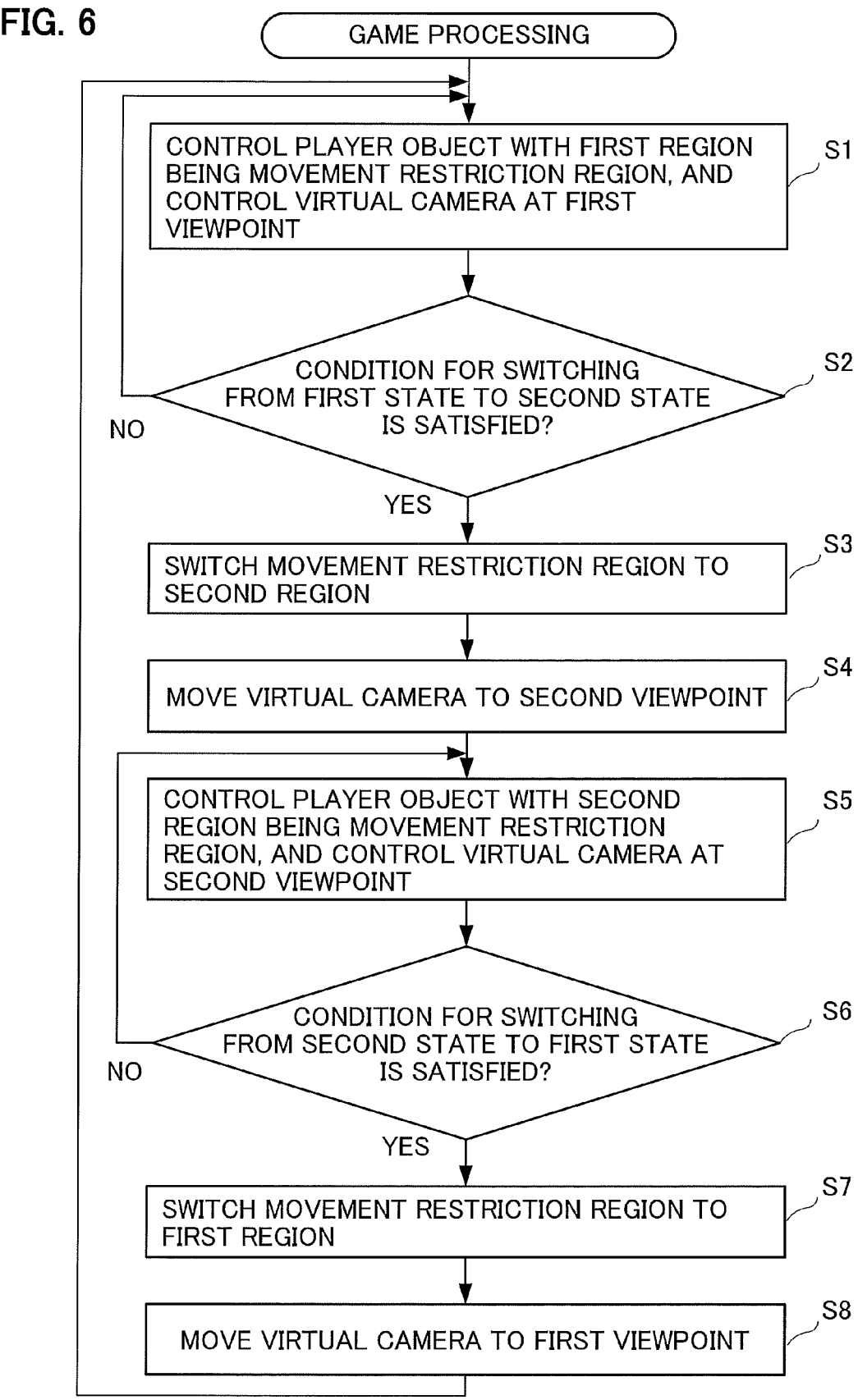

FIG. 6 is a flowchart showing the game processing performed by the game apparatus 10. Description of game processing that does not directly relate to the present embodiment will be omitted. Hereinafter, the game processing performed by the game apparatus 10 will be described with reference to FIG. 6. Although the game processing will be described on the assumption that the movement restriction state immediately after the start of a game is the first state, the movement restriction state may be the second state. Further, the movement restriction state immediately before the end of a last game may be stored in the internal storage device 14, and the movement restriction state immediately after the start of a game may be determined based on the stored movement restriction state. If the movement restriction state immediately after the start of a game is the second state, execution of the game processing is started from step S5.

(Step S1)

The processor 13, serving as an object control section, controls movement of the player object 101 in the first state in which the movement restriction region is the first region (ground 102). At this time, a first object is used as the player object 101. This control is performed in accordance with a movement instruction input as a user operation received by the input device 11 and/or game progress based on a predetermined game rule defined in the game program. The processor 13 also controls movements of other objects such as the enemy character 104 in accordance with the game progress.

Further, the processor 13, serving as a virtual camera control section, places a virtual camera at the first viewpoint in the virtual space. That is, the virtual camera is placed at a high-angle viewpoint that looks down on the first region (ground 102) and the player object 101 in the virtual space substantially in the vertical direction. Further, in association with the movement of the player object 101, the virtual camera also moves while maintaining the high-angle viewpoint. The depression angle of the virtual camera with respect to the player object 101 need not be precisely vertical. For example, the depression angle may be appropriately varied within a range of 30° with respect to the vertical direction, in accordance with the moving direction of the player object 101, so that the face and/or the back of the player object 101 are easily visible. While the virtual camera looks down on the player object 101 substantially in the vertical direction, the player object 101 may be placed with a tilt from the direction perpendicular to the ground 102 so that the face and/or the back of the player object 101 are easily visible from the virtual camera.

(Step S2)

The processor 13, serving as the object control section, determines whether a condition for switching the movement restriction state from the first state to the second state is satisfied. As described above, this condition has previously been defined as that a predetermined user operation is performed and/or that a predetermined game progress situation is realized. As described above, this condition may include a condition different from the condition relating to movement of the player object 101 on the ground 102, such as a condition that a switching instruction input different from a movement instruction input is performed as a user operation. When the condition is not satisfied, the processor 13 returns to step S1, and the game processing in the first state is continued. When the condition is satisfied, the processor 13 goes to the following step S3.

(Step S3)

The processor 13, serving as the object control section, switches the movement restriction state to the second state, and moves the player object 101 to the second region (wall surface 106). At this time, the virtual object to be used as the player object 101 is switched to a second object that is different in shape from the first object.

(Step S4)

The processor 13, serving as the virtual camera control section, moves the virtual camera from the first viewpoint to the second viewpoint in the virtual space. That is, the virtual camera is moved from the high-angle viewpoint that looks down on the ground 102 (the first region) and the player object 101 in the virtual space substantially in the vertical direction, to, for example, a viewpoint that looks the player object 101 and the wall surface 106 as a destination at substantially the same height as the player object 101. At the second viewpoint, the depression angle is reduced as compared to that at the first viewpoint so that the upward direction of the virtual camera approaches the upward direction of the virtual space, and thereby the player can view the side of the player object 101 and the wall surface 106 more easily. Accordingly, the depression angle or the elevation angle with respect to the player object 101 is not necessarily 0°, and the second viewpoint is not necessarily as high as the player object 101.

Further, movement of the virtual camera is performed such that at least either the position or the direction thereof is gradually changed, so that the player can easily know the change of the viewpoint. For example, as described above, the depression angle of the virtual camera is reduced so that the upward direction of the virtual camera approaches the upward direction of the virtual space while gradually reducing the height of the virtual camera with respect to the ground 102, and the virtual camera is gradually rotated to the left or right in the left-right direction viewed from the virtual camera with respect to the ground 102, thereby moving the virtual camera. The second viewpoint may be set such that, when the virtual camera faces the player object 101, an amount of change in the left/right direction viewed from the virtual camera does not exceed a predetermined angle. For example, as described above, when the player object 101 moves to the wall surface 106 in the upward direction or the left-right direction, the amount of change is set to 0° or 90°, respectively. When the player object 101 moves to the wall surface 106 in the downward direction, the amount of change may be set to 135°. In addition, the direction of rotation may be determined as follows. That is, for example, when the player object 101 after moved faces to the right (to the left with respect to the lower wall surface 106), the virtual camera may be rotated 135° to the left. When the player object 101 after moved faces to the left (to the right with respect to the lower wall surface 106), the virtual camera may be rotated 135° to the right. By determining the direction of rotation in this way, as the second viewpoint, a viewpoint is obtained at which the wall surface 106 located forward in the moving direction of the player object 101 is far from the player object 101, which allows the player to easily look over the wall surface 106 as a destination. However, the direction of rotation may be opposite to that described above, and an upper limit of the rotation amount may be set to an angle other than 135°. In this way, the processor 13, serving as the virtual camera control section, sets the second viewpoint in accordance with the moving direction of the player object 101 and the facing direction of the player object 101 after the movement.

(Step S5)

The processor 13, serving as the object control section, controls movement of the player object 101 in the second state in which the movement restriction region is the second region (wall surface 106). At this time, as the player object 101, the second object different in shape from the first object is used as described above. This control is performed in accordance with a user operation and game progress, as in the first state. Further, the enemy character 104 and the like are also moved in accordance with the game progress.

Further, the processor 13, serving as the virtual camera control section, maintains the virtual camera at the second viewpoint in the virtual space, and updates the second viewpoint in accordance with a path along which the player object 101 is scheduled to move. The scheduled moving path may be specified within at least a predetermined moving distance. In addition, the scheduled moving path may be fixed, or may be variable in the future. A method for specifying such a moving path may be appropriately selected according to the shape of the movement restriction region, the game rule, or the like. In the present embodiment, the scheduled moving path can be specified based on a path along the wall surface 106 of the wall 103 in the moving direction of the player object 101, for example.

Figure 7:
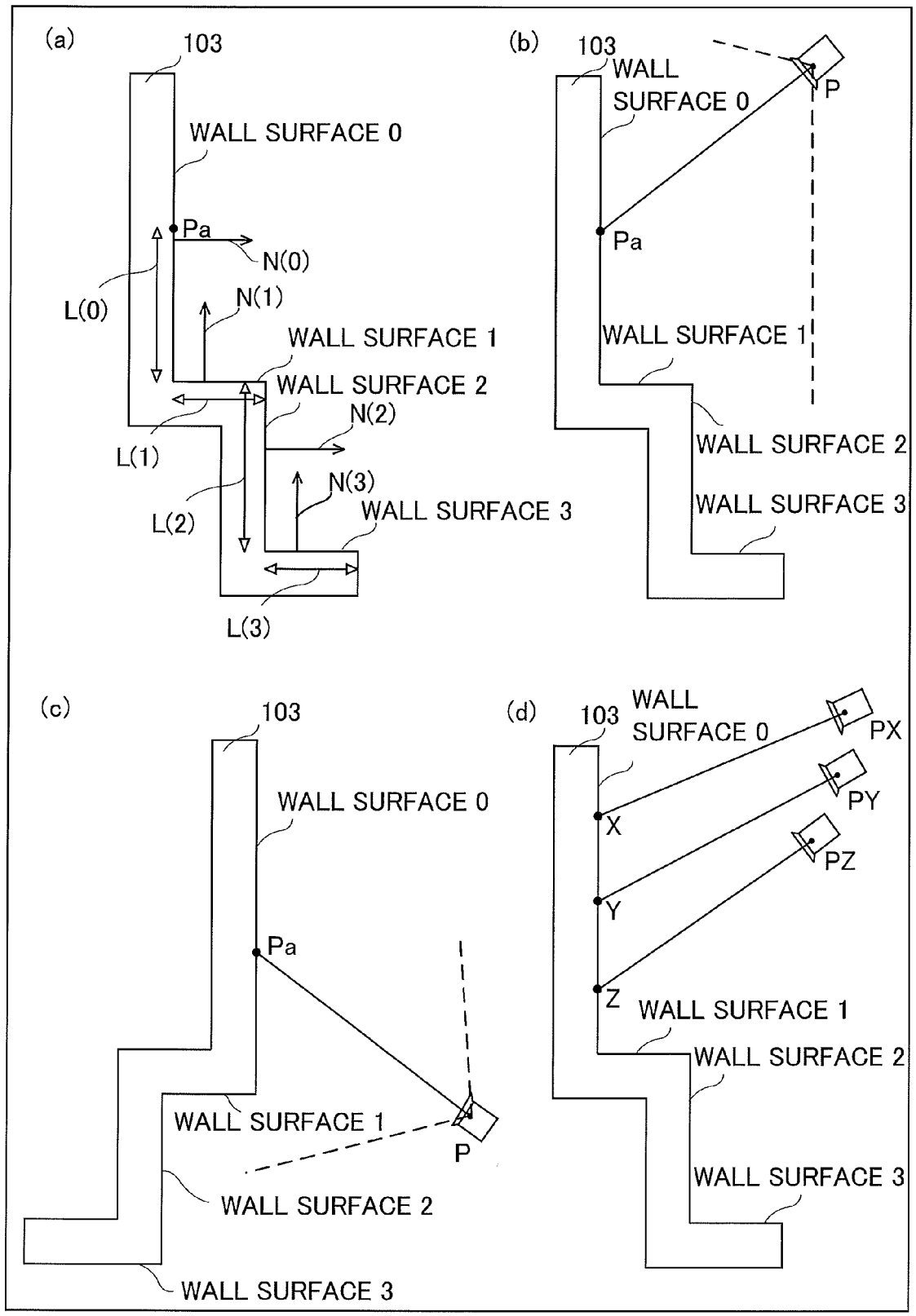
FIG. 7 is a diagram showing a method of calculating a second viewpoint.

Hereinafter, with reference to FIG. 7, an example of a method of calculating a second viewpoint after updated will be described. First, wall surfaces 106 existing within a length L along the moving direction of the player object 101 are extracted. This process is achieved by, for example, searching for, based on the object arrangement data 203, successive wall surfaces 106 starting from a wall surface 106 at which the player object 101 is located. Then, n wall surfaces 106 thus extracted are denoted as a wall surface 0, a wall surface 1, . . . , a wall surface n−1, and the lengths thereof are denoted as L(0), L(1), . . . , L(n−1), respectively. It is noted that L(0) is not the overall length of the wall surface 0, but a length from a current position Pa of the player object 101 to the wall surface 1 adjacent to the wall surface 0. In FIG. 7, a case where n=4 is shown as an example. Further, normal vectors that define the directions of the wall surface 0, the wall surface 1, . . . , the wall surface n−1 are denoted as N(0), N(1), . . . , N(n−1), respectively ((a) of FIG. 7). The normal vectors are vectors having the same magnitude, and extending from the inside of the wall 103 to the outside. The moving direction of the player object 101 may be determined based on the facing direction of the player object 101 along the wall surface 106, for example. Further, instead of the wall surfaces 106 within the length L along the moving direction of the player object 101, n wall surfaces 106 that have previously been determined along the moving direction may be extracted.

Firstly, a sum $L_{SUM}$ of the lengths of the wall surfaces is calculated by using the following (formula 1):

$$L_{SUM} = L(0) + L(1) + \ldots + L(n-1) \quad \text{(formula 1)}$$

Next, a weight W(t) of each wall surface t (t=0, 1, . . . , n−1) is calculated by using the following (formula 2):

$$W(t) = L(t)/L_{SUM} \quad \text{(formula 2)}$$

Further, a vector $D_{irection}$ representing the direction of the virtual camera viewed from the player object 101 is calculated by using the following (formula 3):

$$D_{irection} = n_{orm}(W(0) \times N(0) + W(1) \times N(1) + \ldots + W(n-1) \times N(n-1)) \quad \text{(formula 3)}$$

where $n_{orm}$ ( ) means that the magnitude of the vector is normalized to 1. The vector $D_{irection}$ is obtained by summing the normal vectors of the n wall surfaces in such a manner that the normal vector of the longer wall surface is weighted heavier (is multiplied by a larger coefficient) so that influence of the normal vector of the major wall surface becomes greater, and then normalizing the sum. The weight W(t) determining method is not limited to the method of (formula 2), and may be appropriately modified such that the smaller the t is, the heavier the weight is.

Assuming that the distance between the virtual camera and the player object 101 is CL, a position P of the second viewpoint can be calculated by using the following (formula 4):

$$P = Pa + CL \times D_{irection} \quad \text{(formula 4)}$$

where the distance CL between the virtual camera and the player object 101 may be a predetermined fixed value, or may be varied according to the arrangement of the wall 103 or the like.

Part (b) of FIG. 7 shows the position P of the second viewpoint calculated as described above. Further, part (c) of FIG. 7 shows a position P of the second viewpoint, which is calculated in arrangement of the wall 103 different from those of (a) and (b). In any case, when the direction in which the virtual camera faces ($-D_{irection}$) is viewed from the position P, the wall surfaces 106 in the vicinity of the player object 101 along the scheduled moving path can be looked over with the player object 101 being substantially in the center. Therefore, it is possible to provide the player with an appropriate display image in which the player can easily visibly recognize the scheduled moving path.

Part (d) of FIG. 7 shows how the position and direction of the virtual camera change with movement of the player object 101, in the arrangement of the wall 103 shown in (a) and (b) of FIG. 7. In the calculation of the second viewpoint, when the L(0) is not the overall length of the wall surface 0 but the length from the position of the player object 101 to the wall 1 as described above, L(0) continuously changes with respect to movement of the player object 101, and therefore, the calculation result of the position P of the second viewpoint also continuously changes. For example, as shown in (d) of FIG. 7, as the player object 101 moves along the wall surface 0 through points X, Y, and Z in order toward the wall surface 1, the virtual camera passes through positions PX, PY, and PZ, respectively. While the virtual camera moves in this way, the position and direction of the virtual camera continuously changes. Specifically, the virtual camera gradually changes from the direction in which the virtual camera mainly views the wall surface 0 to the direction in which the virtual camera views the wall surface 1.

Thus, the above-mentioned calculation method prevents the second viewpoint and the viewing direction from sharply changing. However, when updating of the second viewpoint is performed immediately after step S4 or immediately after the change of the facing direction of the player object 101, the calculation result of the position P of the second viewpoint may sharply change. Accordingly, in such a case, the virtual camera may be gradually moved between the second viewpoint before updated and the second viewpoint after updated to reduce the sharp change of the viewpoint.

By controlling the virtual camera as described above, sharp change of the viewpoint can be reduced when the player object 101 passes the corner of the wall surface 106, and the view ahead from the corner is improved, as compared to a case where, for example, the virtual camera follows the player object 101 with its direction being fixed at a constant angle with respect to the wall surface 106 at which the player object 101 is located. Further, it is possible to easily maintain a viewpoint at which the destination of the player object 101 can be favorably viewed, as compared to a case where the position or direction of the virtual camera is simply shifted by a predetermined amount in the moving direction of the player object 101.

In the above description, the scheduled moving path of the player object 101 is specified based on the shape of the wall surface 106. However, if the direction and length of the moving path of the player object 101 can be specified, it is possible to calculate the second viewpoint by a similar method, without based on the shape of the object such as the wall surface 106. In this case, in each of the above-mentioned formulae, a unit vector perpendicular to the direction of the moving path of the player object 101, in each of sections of the moving path, is appropriately selected. The selected unit vectors are denoted as N(0), N(1), . . . , and the lengths of the sections are denoted as L(0), L(1), . . .

(Step S6)

The processor 13, serving as the object control section, determines whether the condition to switch the movement restriction state from the second state to the first state is satisfied. As described above, this condition has previously been defined as that a predetermined user operation is performed, or that a predetermined game progress situation is realized. As described above, this condition may include a condition different from the condition relating to movement of the player object 101 on the wall surface 106, such as a condition that a switching instruction input different from a movement instruction input is performed as a user operation. When the condition is not satisfied, the processor 13 returns to step S5, and the game processing in the second state is continued. When the condition is satisfied, the processor 13 goes to the following step S7.

(Step S7)

The processor 13, serving as the object control section, switches the movement restriction state to the first state, and moves the player object 101 to the first region (ground 102). At this time, the virtual object to be used as the player object 101 is switched to the first object.

(Step S8)

The processor 13, serving as the virtual camera control section, moves the virtual camera from the second viewpoint to the first viewpoint in the virtual space. At this time, the virtual camera may be gradually moved. Thereafter, the processor 13 goes to step S1, and the game processing in the first state is performed.

In each of the steps described above, the virtual camera takes images of the player object 101 and other objects in the virtual space, and the game field, at a predetermined frame rate, for example, 30 frames or 60 frames per sec. That is, the processor 13, serving as an image generation section, generates images of the game field and the objects such as the player object 101 viewed from the virtual camera, at the predetermined frame rate, based on the object data 202, the object arrangement data 203, and the like stored in the main memory 15. The images are successively displayed on the display device 12, and typically, a continuous moving image is provided to the player. Further, when the virtual camera takes an image from the first viewpoint, the processor 13, serving as the image generation section, may generate an image obtained by taking a wider range in the virtual space, as compared to a case where the virtual camera takes an image from the second viewpoint. Further, the processor 13, serving as the virtual camera control section, may set the first viewpoint and the second viewpoint such that the distance between the second viewpoint and the player object 101 is shorter than the distance between the first viewpoint and the player object 101. Thereby, the player is allowed to view, at the first viewpoint, the wide range of the game field, and view, at the second viewpoint, the player object 101 and the details of the vicinity of the player object 101.

The game processing according to the present embodiment has been described above. In the above description, the first region and the second region are the ground 102 and the wall surface 106 in the virtual space, which are substantially perpendicular to each other. However, the movement restriction regions may be other objects, and may not be perpendicular to each other. Further, while the region where the player object 101 is movable is the movement restriction region to be switched, a region where another object such as the enemy character 104 is movable may be the movement restriction region to be switched.

Further, the object control section uses, as the player object 101, the first virtual object and the second virtual object having different shapes in the first state and the second state, respectively. However, these objects may have different colors, different patterns, or the like, in addition to or instead of the different shapes. Alternatively, the same object may be used in the first state and the second state.

(Exemplary Applications)

In the above embodiment, the first region and the second region are the ground 102 and the wall surface 106, each having a planar shape. However, at least one of them may be a region having a three-dimensional shape. Alternatively, for example, a plurality of regions each having a three-dimensional shape and being adjacent to each other in the virtual space may be set as the movement restriction regions. Whether an image of a wide range is to be taken or an image of the vicinity of the player object 101 is to be taken may be selected for each movement restriction region, based on its shape or the like, and the viewpoint of the virtual camera may be appropriately set to the first viewpoint or the second viewpoint, thereby improving the visibility of the game field.

(Modifications)

Figure 8:
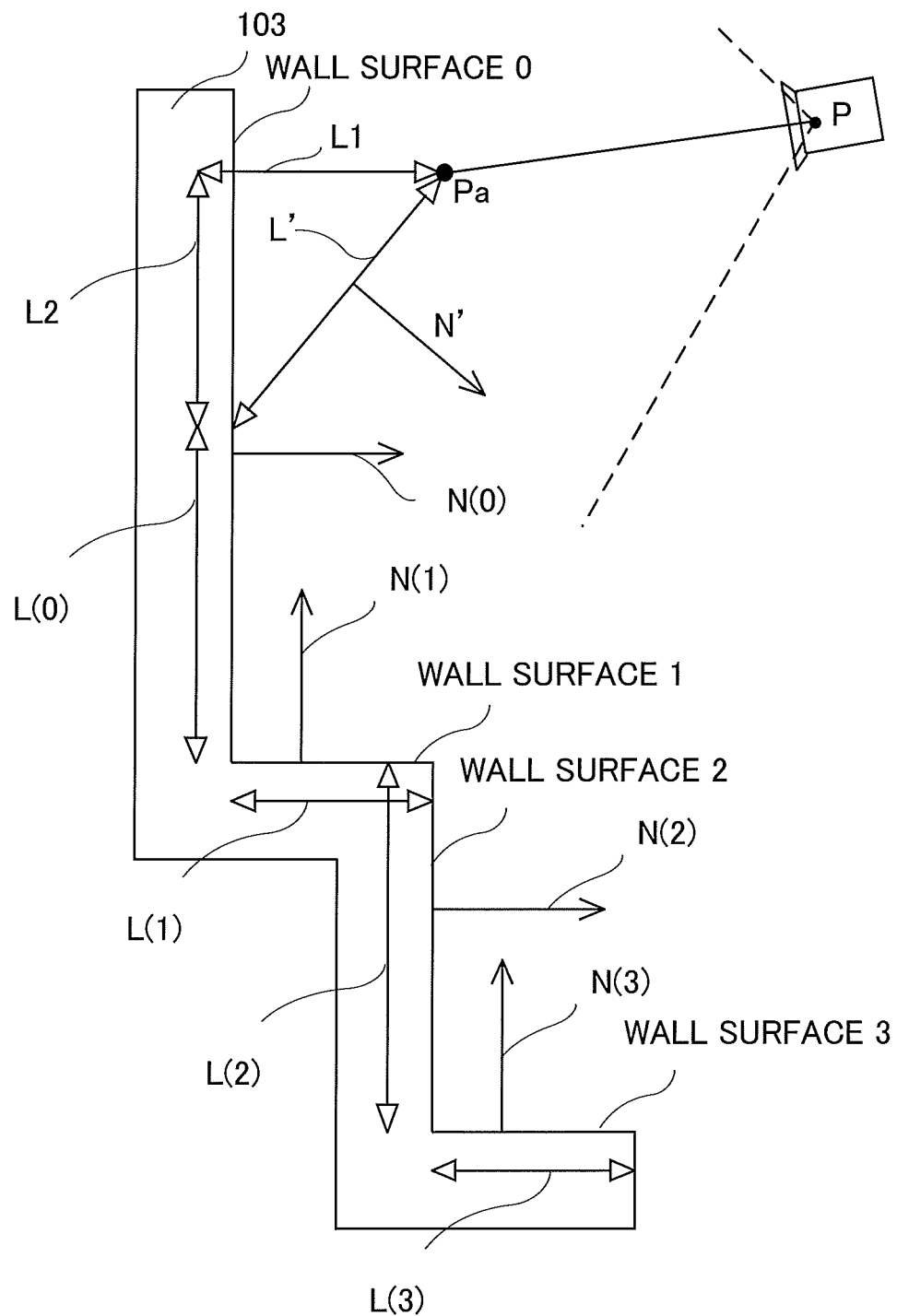
FIG. 8 is a diagram showing a modification of the method of calculating a second viewpoint.

The second viewpoint calculation method in the game processing according to the above embodiment is applicable to a virtual camera arrangement method which allows a player to favorably view the player object 101 and the wall surface 106, in a case where the player object 101 moves from the current position on the ground 102 apart from the wall surface 106 to the vicinity of the wall surface 106, and thereafter, the player object 101 is scheduled to move along the wall surface 106. In this case, the movement restriction region may be changed to the wall surface 106, or may not be changed and the player object 101 may move on the ground 102 in the vicinity of the wall surface 106. With reference to FIG. 8, an example of the method of calculating the second viewpoint after updated will be described. The symbols meaning the same contents as above will not be repeatedly described.

It is assumed that the distance from the current position Pa of the player object 101 to the wall surface 0 located in the moving direction of the player object 101 is L'. In addition, the distance from the intersection of the moving direction and the wall surface 0 to the wall surface 1 is L(0). In this modification, $L_{sum}$ is calculated by using, instead of (formula 1), the following (formula 5):

$$L_{SUM}=L(0)+L(1)+\ldots+L(n-1)+L' \quad \text{(formula 5)}$$

Further, as for the distance L' to the wall 103, a weight W' is calculated by using the following (formula 6):

$$W'=L'/L_{SUM} \quad \text{(formula 6)}$$

Further, a vector $D_{irection}'$ representing the direction of the virtual camera viewed from the player object 101 is calculated by using the following (formula 7). What N' means will be described later.

$$D_{irection}'=n_{orm}(W(0)\times N(0)+W(1)\times N(1)+\ldots+W(n-1)\times N(n-1)+W'\times N') \quad \text{(formula 7)}$$

Assuming that the position of the player object 101 is Pa and the distance between the virtual camera and the player object 101 is CL, the position P' of the second viewpoint can be calculated by using the following (formula 8):

$$P'=Pa+CL\times D_{irection} \quad \text{(formula 8)}$$

In the example shown in FIG. 8, the distance L' between the player object 101 and the wall 103 is, for example, a distance measured along the moving direction of the player object 101. However, instead of the distance L', a shortest distance L1 to the nearest wall surface 0 may be used, or a distance L2 measured in the direction parallel to the wall surface 0 may be used. Further, in the example shown in FIG. 8, the above-mentioned N' is a vector in the direction perpendicular to the moving direction of the player object 101. However, in another example, N' may be a vector in a direction opposite to the moving direction.

The larger the distance L', the closer the direction of the virtual camera is to the direction parallel to N'. Therefore, when N' is a vector in the direction perpendicular to the moving direction of the player object 101, if the player object 101 is far away from each wall surface 106, the virtual camera is set at a position from which the player object 101 is viewed from its side. When N' is a vector in the direction opposite to the moving direction of the player object 101, if the player object 101 is away from each wall surface 106, the virtual camera is set at a position from which the player object 101 is viewed from its back and the wall surface 106 toward which the player object 101 moves is viewed in the distance. Thus, the normal vector N' can be selected so as to be suitable for the characteristics of the game.

In the above embodiment, the game apparatus has been described as an example. However, the technique disclosed above is applicable not only to the game apparatus but also to an information processing apparatus such as a personal computer, and an information processing system. Further, the technique disclosed above is also directed to an information processing method which causes a computer of an information processing apparatus to perform the above-described processes, and to a non-transitory computer-readable storage medium having stored thereon an information processing program which causes a computer of an information processing apparatus to perform the above-described processes.

What is claimed is:

1. A non-transitory computer-readable storage medium having stored thereon an information processing program which causes a computer of an information processing apparatus which controls display of a virtual object located in a virtual space to at least:

in a first state, display a first virtual object having a three-dimensional shape in the virtual space and control movement of the first virtual object based on movement instructions received from an input device, wherein in the first state a region where the first virtual object is moveable in the virtual space is restricted to a first region;

in a second state, display a second virtual object different from the first virtual object and having a planar shape in the virtual space and control movement of the second virtual object, wherein in the second state a region where the second virtual object is movable in the virtual space is restricted to a second region different from the first region, when a predetermined condition is satisfied during the first state, (1) switch from displaying the first virtual object, having the three-dimensional shape in the virtual space, on the first region to displaying the second virtual object, having the planar shape in the virtual space, on the second region and (2) switch to the second state in which the movement of the displayed second virtual object, based on movement instructions received from the input device, is restricted to the second region; and generate an image of the first virtual object or the second virtual object taken by a virtual camera located in the virtual space.

2. The non-transitory computer-readable storage medium according to claim 1, wherein
the first virtual object and the second virtual object are different from each other in at least one of color, and pattern.

3. The non-transitory computer-readable storage medium according to claim 1, wherein the information processing program further causes the computer of the information processing apparatus to set, in the first state, the position of the virtual camera to a first viewpoint, and set, in the second state, the position of the virtual camera to a second viewpoint that is a viewpoint other than the first viewpoint, and wherein
when switching between the first state and the second state, the position of the virtual camera is gradually changed between the first viewpoint and the second viewpoint.

4. The non-transitory computer-readable storage medium according to claim 3, wherein
when switching between the first state and the second state, a direction of the virtual camera is gradually changed between a direction of the virtual camera at the first viewpoint and a direction of the virtual camera at the second viewpoint.

5. The non-transitory computer-readable storage medium according to claim 1, wherein the information processing program further causes the computer of the information processing apparatus to set, in the first state, the position of the virtual camera to a first viewpoint, and set, in the second state, the position of the virtual camera to a second viewpoint that is a viewpoint other than the first viewpoint, and wherein
the image taken from the first viewpoint by the virtual camera is an image obtained by taking a wider region in the virtual space, as compared to an image taken from the second viewpoint by the virtual camera.

6. The non-transitory computer-readable storage medium according to claim 1, wherein the information processing program further causes the computer of the information processing apparatus to set, in the first state, the position of the virtual camera to a first viewpoint, and set, in the second state, the position of the virtual camera to a second viewpoint that is a viewpoint other than the first viewpoint, and wherein
the first viewpoint and the second viewpoint are set so that the distance between the second viewpoint and the second virtual object is shorter than the distance between the first viewpoint and the first virtual object.

7. The non-transitory computer-readable storage medium according to claim 1, wherein
movement of the first virtual object in the first state and movement of the second virtual object in the second state are controlled based on a movement instruction input performed by a user using the input device, which instructs movement of the first virtual object in the first region and instructs movement of the second virtual object in the second region, and
at least one of the switching from the first state to the second state and the switching from the second state to the first state is performed based on a switching instruction input performed by a user, which instructs the switching.

8. The non-transitory computer-readable storage medium according to claim 7, wherein
the switching instruction input is an input different from the movement instruction input for the first virtual object or the second virtual object.

9. The non-transitory computer-readable storage medium according to claim 1, wherein
the first region and the second region are perpendicular to each other in the virtual space.

10. The non-transitory computer-readable storage medium according to claim 9, wherein the information processing program further causes the computer of the information processing apparatus to set, in the first state, the position of the virtual camera to a first viewpoint, and set, in the second state, the position of the virtual camera to a second viewpoint that is a viewpoint other than the first viewpoint, and wherein
a direction of the virtual camera at the second viewpoint is set so that an amount of change in a left/right direction of the virtual camera with respect to the virtual space is equal to or smaller than a predetermined angle, in a case where the position of the virtual camera is switched from the first viewpoint to the second viewpoint.

11. The non-transitory computer-readable storage medium according to claim 1, wherein the information processing program further causes the computer of the information processing apparatus to set, in the first state, the position of the virtual camera to a first viewpoint, and set, in the second state, the position of the virtual camera to a second viewpoint that is a viewpoint other than the first viewpoint, and wherein
in the second state, the second viewpoint is set based on a moving path along which the second virtual object is scheduled to move.

12. The non-transitory computer-readable storage medium according to claim 11, wherein
the moving path is specified based on the shape of the second region.

13. The non-transitory computer-readable storage medium according to claim 12, wherein
the moving path is specified based on the shape of a region within a predetermined distance along the second region from the second virtual object, the region being included in the second region.

14. The non-transitory computer-readable storage medium according to claim 11, wherein
the second viewpoint is set based on at least the direction of a surface of a region along which the moving path extends, the region being included in the second region.

15. The non-transitory computer-readable storage medium according to claim 11, wherein
the second viewpoint is set based on at least the length of the moving path along a region along which the moving path extends, the region being included in the second region.

16. The non-transitory computer-readable storage medium according to claim 1, wherein the predetermined condition includes a condition different from a condition that the first or second virtual object moves in the region where the first or second virtual object is movable, in at least one of switching from the first state to the second state and switching from the second state to the first state.

17. The non-transitory computer-readable storage medium according to claim 1, wherein the information processing program further causes the computer of the information processing apparatus to set, in the first state, the position of the virtual camera to a first viewpoint, and set, in the second state, the position of the virtual camera to a second viewpoint that is a viewpoint other than the first viewpoint, and wherein the first viewpoint is a high-angle viewpoint with respect to the first region.

18. The non-transitory computer-readable storage medium according to claim 1, wherein the predetermined condition is a condition that a predetermined input is received from an input device while a distance between the first virtual object and the second region is equal to or less than a predetermined distance.

19. The non-transitory computer-readable storage medium according to claim 1, wherein the predetermined condition is a condition that a predetermined virtual item located in the virtual space is acquired by the first virtual object or the second virtual object.

20. The non-transitory computer-readable storage medium according to claim 1, wherein the object controller is further configured to, after a predetermined time period in the second state, switch from the second state to the first state.

21. The non-transitory computer-readable storage medium according to claim 1, wherein movement of the first virtual object and the movement of the second virtual object are controlled according to inputs performed by a player.

22. The non-transitory computer-readable storage medium according to claim 21, wherein a state in which only the first virtual object is moved according to the inputs and a state in which only the second virtual object is moved according to the inputs are switched in accordance with the predetermined condition.

23. An information processing apparatus which controls display of a virtual object located in a virtual space, comprising a processing system, including at least one processor, the processing system being at least configured to:
in a first state, display a first virtual object having a three-dimensional shape in the virtual space and control movement of the first virtual object based on movement instructions received from an input device, wherein in the first state a region where the first virtual object is moveable in the virtual space is restricted to a first region,
in a second state, display a second virtual object different from the first virtual object and having a planar shape in the virtual space and control movement of the second virtual object, wherein in the second state a region where the second virtual object is movable in the virtual space is restricted to a second region different from the first region,
when a predetermined condition is satisfied during the first state, (1) switch from displaying the first virtual object, having the three-dimensional shape in the virtual space, on the first region to displaying the second virtual object, having the planar shape in the virtual space, on the second region and (2) switch to the second state in which the movement of the displayed second virtual object, based on movement instructions received from the input device, is restricted to the second region; and
generate an image of the first virtual object or the second virtual object taken by a virtual camera located in the virtual space.

24. The information processing apparatus according to claim 23, wherein movement of the first virtual object and the movement of the second virtual object are controlled according to inputs performed by a player.

25. The information processing apparatus according to claim 24, wherein a state in which only the first virtual object is moved according to the inputs and a state in which only the second virtual object is moved according to the inputs are switched in accordance with the predetermined condition.

26. The information processing apparatus according to claim 23, wherein the predetermined condition is a switching instruction input via the input device that is different from the movement instruction received from the input device controlling movement of the first virtual object on the first region or controlling movement of the second virtual object on the second region.

27. An information processing system, comprising:
an input device;
a display; and
a processing circuitry, including at least one processor, coupled to the display and the input device, the processing circuitry being at least configured to:
in a first state, display a first virtual object having a three-dimensional shape in the virtual space and control movement of the first virtual object based on movement instructions received from an input device, wherein in the first state a region where the first virtual object is moveable in the virtual space is restricted to a first region;
in a second state, display a second virtual object different from the first virtual object and having a planar shape in the virtual space and control movement of the second virtual object, wherein in the second state a region where the second virtual object is movable in the virtual space is restricted to a second region different from the first region;
when a predetermined condition is satisfied during the first state, (1) switch from displaying the first virtual object, having the three-dimensional shape in the virtual space, on the first region to displaying the second virtual object, having the planar shape in the virtual space, on the second region and (2) switch to the second state in which the movement of the displayed second virtual object, based on movement instructions received from the input device, is restricted to the second region; and
generate and display, on the display, an image of the first virtual object or the second virtual object taken by a virtual camera located in the virtual space.

28. An information processing method performed by a computer of an information processing apparatus which controls display of a virtual object located in a virtual space, the method comprising:
in a first state, displaying a first virtual object having a three-dimensional shape in the virtual space and controlling, by the computer, movement of the first virtual object based on movement instructions received from an input device, wherein in the first state a region where the first virtual object is moveable in the virtual space is restricted to a first region;
in a second state, display a second virtual object different from the first virtual object and having a planar shape in the virtual space and controlling, by the computer, movement of the second virtual object, wherein in the second state a region where the second virtual object is movable in the virtual space is restricted to a second region different from the first region;

when a predetermined condition is satisfied during the first state, (1) switching, by the computer, from displaying the first virtual object, having the three-dimensional shape in the virtual space, on the first region to displaying the second virtual object, having the planar shape in the virtual space, on the second region and (2) switch to the second state in which the movement of the displayed second virtual object, based on movement instructions received from the input device, is restricted to the second region; and generating, by the computer, an image of the first virtual object or the second virtual object taken by a virtual camera located in the virtual space.

29. A non-transitory computer-readable storage medium having stored thereon an information processing program which causes a computer of an information processing apparatus which controls display of a virtual object located in a virtual space to operate as:

an object controller configured to:
control movement of the virtual object in a first state and a second state;
in response to a predetermined condition, switch from the first state to the second state;
in the first state, display the virtual object on a first surface in the virtual space and restrict the movement of the virtual object to the first surface;
in the second state, display the virtual object on a second surface in the virtual space, different from the first surface, and restrict the movement of the virtual object to the second surface; and
when the predetermined condition is satisfied in the first state, move the virtual object from the first surface to the second surface; and an image generator configured to generate an image of the virtual object taken by a virtual camera located in the virtual space, wherein the predetermined condition includes a condition different from a condition that the virtual object moves from the first surface to the second surface.

30. An information processing apparatus, comprising:
a display; and
a processing system, including at least one processor, coupled to the display, the processing system being at least configured to:
control movement of a first virtual object and a second virtual object in a three-dimensional virtual space based on movement instructions received from an input device, wherein in a first state, the first virtual object is displayed and movement of the first virtual object is restricted to a first surface in the virtual space and in a second state, the second virtual object is displayed and movement of the second virtual object is restricted to a second surface that is different from the first surface in the virtual space;
when a predetermined condition is satisfied during the first state, (1) switch to the second state and (2) switch from displaying the first virtual object on the first surface to displaying the second virtual object on the second surface, wherein the first virtual object is displayed having a three-dimensional shape in the virtual space and the second virtual object is displayed having a two-dimensional shape that corresponds to the shape of the second surface on which the second virtual object is displayed; and
display on the display an image, taken by a virtual camera in the virtual space, of the first virtual object in the first state and an image, taken by the virtual camera in the virtual space, of the second virtual object in the second state.

31. The information processing apparatus according to claim 30, wherein the predetermined condition is satisfied when a predefined object control instructions and acquiring a predetermined item in the virtual space.

* * * * *